(12) United States Patent
Ohta et al.

(10) Patent No.: US 7,753,544 B2
(45) Date of Patent: Jul. 13, 2010

(54) LIGHT CONTROL PLATE, SURFACE LIGHT SOURCE DEVICE AND TRANSMISSIVE IMAGE DISPLAY DEVICE

(75) Inventors: Hirofumi Ohta, Tsukuba (JP); Gihwan Ahn, Cheongju-si (KR); Byoungin Kim, Seoul (KR)

(73) Assignee: Sumitomo Chemical Company, Limited, Tokyo (JP)

( * ) Notice: Subject to any disclaimer, the term of this patent is extended or adjusted under 35 U.S.C. 154(b) by 197 days.

(21) Appl. No.: 12/146,830

(22) Filed: Jun. 26, 2008

(65) Prior Publication Data
US 2009/0003017 A1 Jan. 1, 2009

(30) Foreign Application Priority Data
Jun. 29, 2007 (JP) ............................. 2007-172769

(51) Int. Cl.
G09F 13/04 (2006.01)
G09F 13/08 (2006.01)
(52) U.S. Cl. ............... 362/97.2; 362/97.1; 362/330; 362/335; 349/62
(58) Field of Classification Search .................. 349/62; 362/97.1, 97.2, 244, 330, 335, 606
See application file for complete search history.

(56) References Cited
U.S. PATENT DOCUMENTS
5,890,791 A * 4/1999 Saito .......................... 362/330
7,534,024 B2 * 5/2009 Yamashita et al. .......... 362/330

FOREIGN PATENT DOCUMENTS
JP 2006-351519 A 12/2006

* cited by examiner

Primary Examiner—Stephen F Husar
(74) Attorney, Agent, or Firm—Sughrue Mion, PLLC

(57) ABSTRACT

A light control plate 30A of the present invention is disposed in front of a surface light source 20 that emits, in a predetermined direction, parallel light $F_i$ having a substantially uniform luminance distribution. The light control plate 30A has a light incidence surface 30a, at which there are provided optical path control sections 31A of concave and/or convex cross-sectional shape, and a planar light exit surface 30b. The surface of the optical path control sections 31A comprises first to M-th planar portions $32A_1$ to $32A_M$. The inclination angles $\alpha_1$ to $\alpha_M$ and pitch ratios $L_1$ to $L_M$ of each planer portion are specified in such a manner that the parallel light $F_i$ can be spread within an exit angle range $-\theta_{max}$ to $\theta_{max}$ relative to the predetermined direction, to exit as light having a substantially uniform luminance angular distribution within the exit angle range. Thereby, parallel light having a uniform luminance distribution can be spread within a predetermined angle range, to exit as light having a substantially uniform luminance angular distribution within the angle range.

20 Claims, 14 Drawing Sheets

(a)

(b)

LIGHT CONTROL PLATE, SURFACE LIGHT SOURCE DEVICE AND TRANSMISSIVE IMAGE DISPLAY DEVICE

BACKGROUND OF THE INVENTION

1. Field of the Invention

The present invention relates to a light control plate, a surface light source device and a transmissive image display device.

2. Related Background Art

A surface light source device that outputs parallel light having a uniform luminance distribution, as illumination light, is described in, for instance, Japanese Patent Application Laid-open No. 2006-351519. This surface light source device comprises a light-diffuser plate disposed in front of a plurality of light sources that are arranged spaced apart from each other in a lamp box. The light-diffuser plate is provided with a deflection structure having a shape such that incident light from the plurality of light sources that strikes the light-diffuser plate can be deflected and emitted in a forward direction that is a substantially perpendicular direction to the surface of the light-diffuser plate. By passing through the light-diffuser plate, the light outputted from the plurality of light sources can be guided as a result into a forward direction, which is a substantially perpendicular direction to the surface of the light-diffuser plate, while allowing, through diffusion, to output parallel light having a uniform luminance distribution, as illumination light.

SUMMARY OF THE INVENTION

Although, as described above, light can be outputted as parallel light of uniform luminance distribution in the above surface light source device, unevenness of image may occur, or it may be desired to ensure an appropriate viewing angle, depending on the application of the surface light source device. In such cases it becomes necessary to control the angular distribution of luminance, and to spread the parallel light within an appropriate range. With a view to meeting the above requirements, the angular distribution of the outgoing light can be spread by, for instance, stacking diffusing plates, but doing so makes it difficult to control diffusion direction and the angular distribution of the outgoing light, and may impair transmittance.

In light of the above, it is an object of the present invention to provide a light control plate, a surface light source device and a transmissive image display device that allow parallel light having a uniform luminance distribution to be spread within a predetermined exit angle range, and to be emitted as light having a substantially uniform luminance angular distribution within that exit angle range.

The light control plate according to the present invention is a light control plate, which is disposed, relative to a surface light source, on the side of a predetermined direction in which the surface light source emits parallel light having a substantially uniform luminance distribution, and which is disposed so as to be substantially perpendicular to the predetermined direction, the light control plate comprising: a light incidence surface onto which the parallel light from the surface light source is incident; and a planar light exit surface, disposed opposite the light incidence surface, from which the parallel light that is incident on the light incidence surface exits as outgoing light, wherein an optical path control section extending in one direction and having a concave and/or convex cross-sectional shape is formed on the light incidence surface, the surface of the optical path control section comprises first to M-th planar portions (M is an integer equal to or greater than 2) respectively extending in the one direction, an inclination angle $\alpha_m$ formed between a plane parallel to the light exit surface and an m-th planar portion (m is an integer from 1 to M) satisfies

[Equation 1]

$$\alpha_m = \sin^{-1}\left\{\frac{n}{n_0}\sin(\alpha_m - \xi_m)\right\} \quad (1)$$

in which

[Equation 2]

$$\xi_m = \sin^{-1}\left\{\frac{n_1}{n}\sin\theta_m\right\} \quad (2)$$

[Equation 3]

$$\theta_m = \frac{2m - M - 1}{M - 1}\theta_{max} \quad (3)$$

where n is a refractive index of the light control plate, $n_0$ is a refractive index at the light incidence surface on the side of the surface light source, $n_1$ is a refractive index at the light exit surface on an opposite side to the light incidence surface, $-\theta_{max}$ to $\theta_{max}$ is an exit angle range of the outgoing light relative to the predetermined direction, $\theta_m$ is an exit angle, relative to the predetermined direction, of light, within the parallel light, which is incident via the m-th planar portion and exits through the light exit surface, $I(\theta_m)$ is the luminance in the direction of the exit angle $\theta_m$, and T is the transmittance of the light control plate to the parallel light, a pitch ratio $L_m$ of the m-th planar portion satisfies

[Equation 4]

$$L_m = \frac{l_m}{\sum_{k=1}^{M} l_k} \quad (4)$$

in which

[Equation 5]

$$l_m = \frac{I(\theta_m)\cos\theta_m}{T} \quad (5)$$

and the luminance $I(\theta_m)$ is substantially constant within the exit angle range.

Herein, an optical path control section having a concave and/or convex cross-sectional shape is formed on the light incidence surface of the light control plate, and hence light within the parallel light that is incident via different regions of the optical path control section is refracted in a direction that depends on the incidence region, propagates through the light control plate, and thereafter exits through the light exit surface. As a result, the luminance angular distribution and the spread of the outgoing light are controlled in accordance with the surface shape of the optical path control section. The surface of the optical path control section of the light control plate comprises first to M-th planar portions having inclination angles that satisfy equations (1) through (3). The parallel light passing through the m-th planar portion exits with the exit angle prescribed by equation (3). As a result, the parallel light that is incident on the optical path control section, having the first to M-th planar portions, exits spread within an exit angle range $-\theta_{max}$ to $\theta_{max}$. The transmittance of the parallel light that strikes the first to M-th planar portions varies depending on the inclination angles of the first to M-th planar portions, while the amount of parallel light passing through the first to M-th planar portions is controlled by the pitch ratios thereof. The pitch ratios satisfy equations (4) and (5), and the luminance $I(\theta_m)$ in the exit angle $\theta_m$ direction is substantially constant within the above exit angle range. Hence, the outgoing light that exits through the light exit surface has a constant luminance angular distribution within the exit angle range.

In a light control plate having the above constitution, the transmittance T satisfies preferably

[Equation 6]

$$T = \frac{P}{1+P}T_s + \frac{1}{1+P}T_p \quad (6)$$

where P is $E_s/E_p$, $E_s$ and $E_p$ being the energies of an S-polarized component and a P-polarized component in the parallel light, and $T_s$ and $T_p$ are the transmittances of the S-polarized component and the P-polarized component in the light control plate.

The transmittance T used herein takes into account the degree of polarization of the parallel light emitted by the surface light source. This affords therefore a more uniform luminance angular distribution.

The present invention relates also to the light control plate below.

Specifically, the present invention relates to a light control plate, which is disposed, relative to a surface light source, on the side of a predetermined direction in which the surface light source emits parallel light having a substantially uniform luminance distribution, and which is disposed so as to be substantially perpendicular to the predetermined direction, the light control plate comprising: a planar light incidence surface onto which the parallel light from the surface light source is incident; and a light exit surface, disposed opposite the light incidence surface, from which the parallel light that is incident on the light incidence surface exits as outgoing light, wherein an optical path control section extending in one direction and having a concave and/or convex cross-sectional shape is formed on the light exit surface, the surface of the optical path control section comprises first to M-th planar portions (M is an integer equal to or greater than 2) respectively extending in the one direction; an inclination angle $\alpha_m$ formed between a plane parallel to the light incidence surface and an m-th planar portion (m is an integer from 1 to M) satisfies

[Equation 7]

$$\alpha_m = \sin^{-1}\left\{\frac{n_1}{n}\sin(\theta_m + \alpha_m)\right\} \quad (7)$$

in which

[Equation 8]

$$\theta_m = \frac{2m - M - 1}{M - 1}\theta_{max} \quad (8)$$

where n is a refractive index of the light control plate, $n_1$ is a refractive index at the light exit surface on an opposite side to the light incidence surface, $-\theta_{max}$ to $\theta_{max}$ is an exit angle range of the outgoing light relative to the predetermined direction, $\theta_m$ is an exit angle, relative to the predetermined direction, of light, within the outgoing light, that exits through the m-th planar portion, $I(\theta_m)$ is the luminance in the direction of the exit angle $\theta_m$, and T is the transmittance of the light control plate to the parallel light, a pitch ratio $L_m$ of the m-th planar portion satisfies

[Equation 9]

$$L_m = \frac{l_m}{\sum_{k=1}^{M} l_k} \quad (9)$$

in which

[Equation 10]

$$l_m = \frac{I(\theta_m)\cos\theta_m}{T} \quad (10)$$

and the luminance $I(\theta_m)$ is substantially constant within the exit angle range.

In this case, the light incidence surface of the light control plate is planar, and the parallel light strikes the light control plate substantially perpendicularly. Also, an optical path control section having a concave and/or convex cross-sectional shape is provided on the light exit surface, and hence the outgoing light, within the parallel light, that passes through different regions of the surface of the optical path control section, exits refracted into a direction that depends on the exit position of the outgoing light. As a result, the luminance angular distribution and the spread of the outgoing light are controlled in accordance with the surface shape of the optical path control section. In a light control plate having such a constitution, the surface of the optical path control section of the light control plate comprises first to M-th planar portions having inclination angles that satisfy equations (7) and (8). The parallel light passing through the m-th planar portion exits with the exit angle prescribed by equation (8). Therefore, the parallel light that exits via the optical path control section, having the first to M-th planar portions, exits as outgoing light spread within an exit angle range $-\theta_{max}$ to $\theta_{max}$. The transmittance of the parallel light that exits through the first to M-th planar portions varies depending on the inclination angles of the first to M-th planar portions, while the amount of parallel light exiting through the first to M-th planar portions is controlled by the pitch ratios thereof. The pitch ratios satisfy equations (9) and (10), and the luminance $I(\theta_m)$ in the exit angle $\theta_m$ direction is substantially constant within the above exit angle range. Hence, the outgoing light that exits through the light control plate has a constant luminance angular distribution within the exit angle range.

When the light control plate has thus such an optical path control section provided on the light exit surface, the transmittance T is preferably

[Equation 11]

$$T = \frac{P}{1+P}T_s + \frac{1}{1+P}T_p \quad (11)$$

where P is $E_s/E_p$, $E_s$ and $E_p$ being the energies of an S-polarized component and a P-polarized component in the parallel light, and $T_s$ and $T_p$ are the transmittances of the S-polarized component and the P-polarized component in the light control plate.

The transmittance T used herein takes into account the degree of polarization of the parallel light emitted by the surface light source. This affords therefore a more uniform luminance angular distribution.

Moreover, all the above-described light control plates have preferably a plurality of the optical path control sections, and the plurality of optical path control sections is arrayed in a direction substantially perpendicular to the predetermined direction and the one direction. Providing thus a plurality of optical path control sections allows spreading the parallel light more reliably within the exit angle range, while making the luminance angular distribution more uniform within the exit angle range.

The surface light source device according to the present invention comprises a surface light source that emits parallel light having a substantially uniform luminance distribution, in a predetermined direction; and the light control plate according to the present invention, which is disposed, relative to the surface light source, on the side of the predetermined direction, and which is disposed so as to be substantially perpendicular to the predetermined direction. By passing through the light control plate, the parallel light emitted in a predetermined direction from the surface light source becomes outgoing light, spread within an exit angle range, and having a luminance angular distribution that is substantially uniform within the exit angle range. That is, the light that exits through the surface light source device has an angular spread from $-\theta_{max}$ to $\theta_{max}$ and has a uniform luminance angular distribution within that exit angle range.

Further, the transmissive image display device according to the present invention comprises the surface light source device according to the present invention, and a transmissive image display section disposed, relative to the surface light source device, on the side of the predetermined direction, and onto which the outgoing light from the surface light source device is incident. In the above constitution, the outgoing light exiting from the surface light source device, having an angular spread from $-\theta_{max}$ to $\theta_{max}$ and a uniform luminance angular distribution within that exit angle range, strikes the transmissive image display section, whereby unevenness of image can be suppressed, and/or a predetermined viewing angle can be easily ensured.

By way of the light control plate of the present invention, thus, parallel light having a uniform luminance distribution can be spread within a predetermined angle range to exit as light having a substantially uniform luminance angular distribution within that exit angle range. By way of the surface light source device of the present invention, also, parallel light having a uniform luminance distribution can be spread within a predetermined angle range to exit as light having a substantially uniform luminance angular distribution within that exit angle range. Furthermore, the transmissive image display device of the present invention allows light spread within a predetermined exit angle range, and having a substantially uniform luminance angular distribution within that exit angle range, to strike a transmissive image display section, whereby unevenness of image can be suppressed, and/or a predetermined viewing angle can be easily ensured.

DESCRIPTION OF THE PREFERRED EMBODIMENTS

Figure 1:
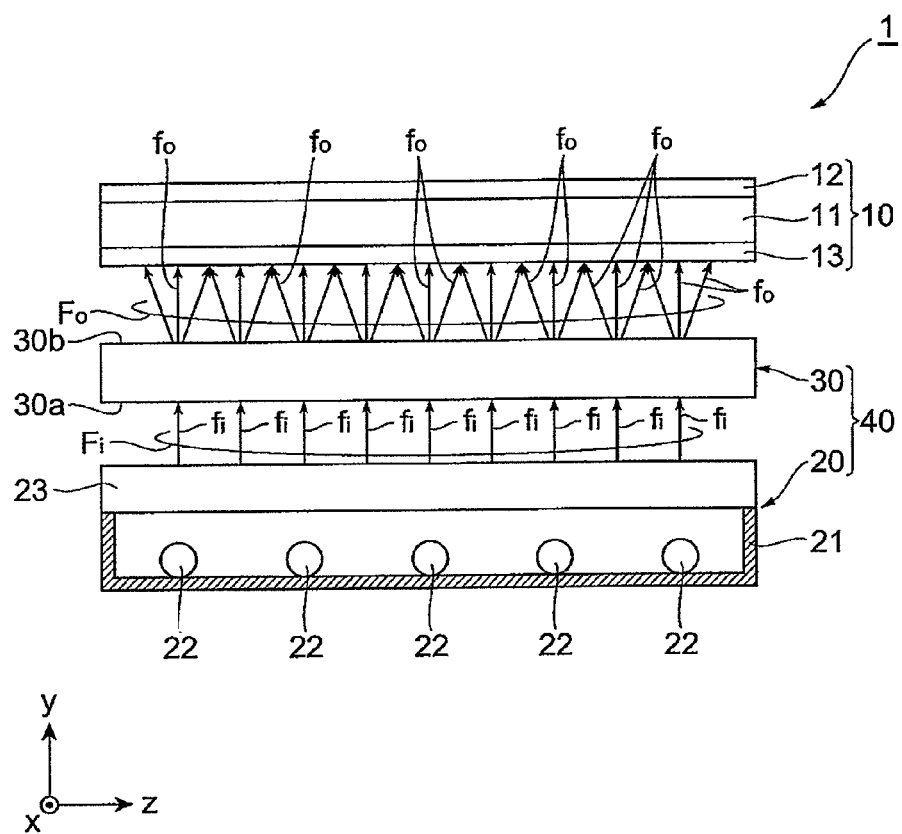
FIG. 1 is a side-view diagram illustrating schematically an embodiment of a transmissive image display device according to the present invention.

An embodiment of the light control plate, the surface light source device and the transmissive image display device of the present invention is explained next with reference to accompanying drawings. In the drawings, identical elements are denoted with identical reference numerals, and recurrent explanations thereof are omitted. Also, the dimensional ratios in the drawings do not necessarily match those in the explanation.

FIG. 1 is a side-view diagram illustrating the constitution of an embodiment of a transmissive image display device according to the present invention. FIG. 1 illustrates schematically the various constituent elements of the transmissive image display device. For the sake of explanation, the constitution of the below-described surface light source is represented cross-sectionally.

The transmissive image display device 1 is a liquid crystal display device having a transmissive image display section 10 in which polarizing plates 12, 13 are layered on the top and bottom faces of a liquid crystal cell 11, and a surface light source device 40 provided at the back of (below) the transmissive image display section 10. The transmissive image display device 1 is not limited to a liquid crystal display device, but will be explained herein as such. In the explanation that follows, the y-axis direction denotes the direction in which the surface light source device 40 and the transmissive image display section 10 are arrayed (upward direction in FIG. 1), the z-axis direction is a direction perpendicular to the y-axis direction in the paper plane, and the x-axis direction is the direction perpendicular to the z-axis direction and the y-axis direction, as illustrated in FIG. 1.

As the liquid crystal cell 11 and the polarizing plates 12, 13 comprised in the transmissive image display section 10 there can be used liquid crystal cells and polarizing plates that are employed in transmissive image display devices such as conventional liquid crystal display devices and the like. Examples of the liquid crystal cell 11 include, for instance, 90° twist TN liquid crystal display elements. The pair of polarizing plates 12, 13 at the top and bottom is disposed in such a manner that the respective transmission axes thereof are perpendicular to each other. The transmission axes of the polarizing plates 12, 13 are disposed so as to be parallel to the orientation direction of the liquid crystal molecules in the liquid crystal cell 11.

The surface light source device 40 has a surface light source 20, and a light control plate 30 provided above the surface light source 20.

The constitution of the surface light source 20 is not particularly limited, as long as it can emit parallel light having a uniform luminance distribution. As the surface light source 20 there can be used, for instance, the surface light source disclosed in Japanese Patent Application Laid-open No. 2006-351519. An explanation follows next on the surface light source 20 illustrated in FIG. 1.

The surface light source 20 comprises a thin box-type lamp box 21 having an open top side, a plurality of light sources 22 disposed in the lamp box 21 spaced apart from one another, and a light-diffuser plate 23 placed and fixed so as to block the open surface of the lamp box 21.

Figure 2:
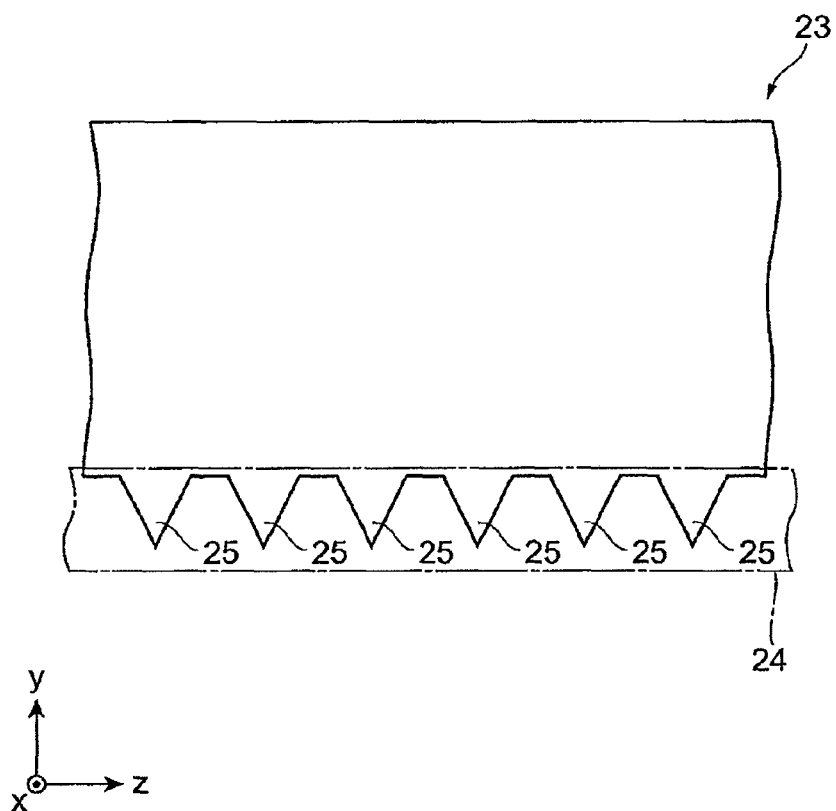
FIG. 2 is a side-view diagram illustrating schematically the constitution of the embodiment of a surface light source illustrated in FIG. 1.

As illustrated in FIG. 2, the top face of the light-diffuser plate 23, i.e. the face opposite the light sources 22, is flat, while the face of the light-diffuser plate 23 on the side of the light sources 22 is provided with a deflecting structure 24, as illustrated in the regions enclosed by the dotted-dashed line in FIG. 2, for refracting the light from the light sources 22 into the y-axis direction. As illustrated in FIG. 2, the deflecting structure 24 may comprise, for instance, multiple prisms 25, of substantially triangular cross section that are integrally formed, extending in the x-axis direction, on the surface of the light-diffuser plate 23 on the side of the light sources 22. The shape of each prism 25 is determined on the basis of the spacing between adjacent light sources 22, the refractive index of the light-diffuser plate 23, and the distance between the light sources 22 and the light-diffuser plate 23, in such a manner that the orientation of light from the light sources 22 is changed into the y-axis direction. Specifically, the apex angle of each prism 25 is determined on the basis of the spacing between adjacent light sources 22, the refractive index of the light-diffuser plate 23, and the distance between the light sources 22 and the light-diffuser plate 23, in such a way so as to fulfill the above function.

In the surface light source 20 having the above constitution, thus, light from the light sources 22 is deflected into the y-axis direction by passing through the deflecting structure 24, is diffused in the light-diffuser plate 23, and thereafter exits through the top face of the light-diffuser plate 23. The top face of the light-diffuser plate 23 is flat, and hence parallel light $F_i$ having a substantially uniform luminance distribution is outputted from the surface light source 20 in the normal line direction (predetermined direction) of the top face, as illustrated in FIG. 1. The parallel light $F_i$ is explained below as an aggregate of a plurality of mutually parallel light beams $f_i$.

As illustrated in FIG. 1, the light control plate 30 is provided above the surface light source 20 (on the side of the transmissive image display section 10). The light control plate 30 controls the angular distribution of the parallel light $F_i$ emitted from the surface light source 20, to convert the parallel light $F_i$ into outgoing light $F_o$ spread within a predetermined angle range. The outgoing light $F_o$ is explained below as an aggregate of a plurality of light beams $f_o$, as shown in FIG. 1.

The light control plate 30 is a plate-like body comprising a light incidence surface 30a onto which the parallel light $F_i$ emitted from the surface light source 20 is incident and a light exit surface 30b disposed opposite the light incidence surface 30a. The light control plate 30 is disposed in such a manner that the light exit surface 30b is substantially perpendicular to the y-axis direction.

The light control plate 30 comprises a transparent material, such as a transparent resin and/or a transparent glass. Examples of transparent resins include, for instance, polycarbonate resins, ABS resins (acrylonitrile-butadiene-styrene copolymer resins), methacrylic resins, MS resins (methyl methacrylate-styrene copolymer resins), polystyrene resins, AS resins (acrylonitrile-styrene copolymer resins), as well as polyolefin resins such as polyethylene, polypropylene or the like. The thickness of the light control plate 30 is ordinarily 0.1 mm to 15 mm, preferably 0.5 mm to 10 mm, and more preferably 1 mm to 5 mm. The light control plate 30 may have dispersed therein a light diffusing material.

Either the light incidence surface 30a or the light exit surface 30b of the light control plate 30 is planar, while on the other surface there are provided, along the entire z-axis direction, plural optical path control sections 31 extending in the x-axis direction (one direction) and finely structured to exhibit concave and/or convex shapes in a cross section perpendicular to the x-axis direction. The optical path control sections 31 control the luminance angular distribution of the parallel light $F_i$ so as to spread it within a predetermined angle range.

The light control plate 30 can be embodied in various ways in accordance with, for instance, the cross-sectional shape and arrangement position of the optical path control sections 31. The constitution of the light control plate 30 is explained in detail next.

Figure 3:
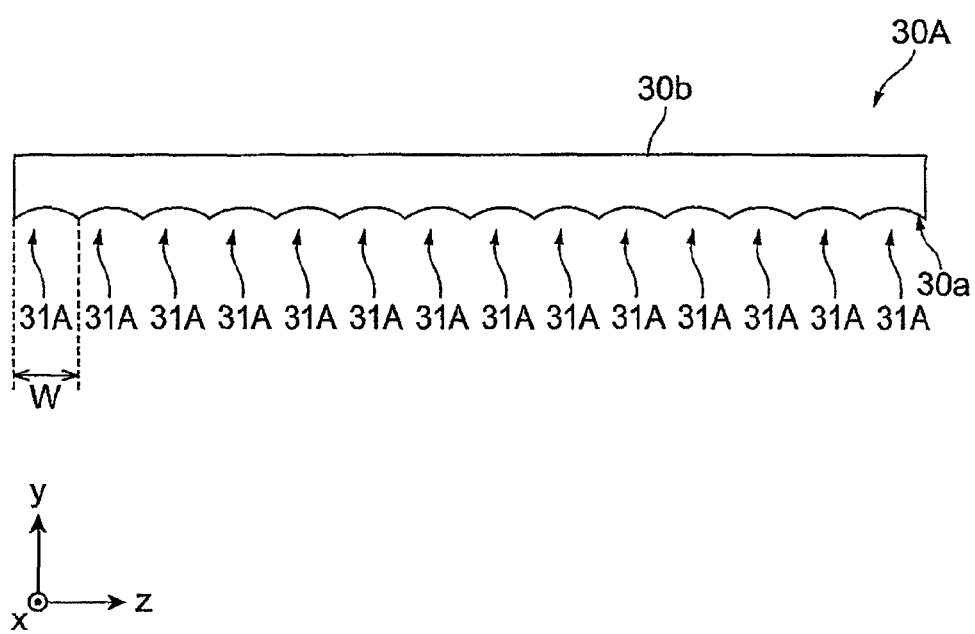
FIG. 3 is a side-view diagram illustrating schematically the constitution of a first embodiment of the light control plate according to the present invention.

FIG. 3 is a side-view diagram illustrating schematically the constitution of a first embodiment of the light control plate 30.

As illustrated in FIG. 3, plural optical path control sections 31A are closely formed on the light incidence surface 30a of a light control plate 30A, along the entire z-axis direction. The optical path control sections 31A are each finely structured to exhibit a concave cross-sectional shape in the x-axis direction. The width W of each optical path control section 31A, i.e. the length in the z-axis direction, is, for instance, 10 μm to 500 μm, preferably 10 μm to 200 μm, and more preferably 10 μm to 100 μm.

Figure 4:
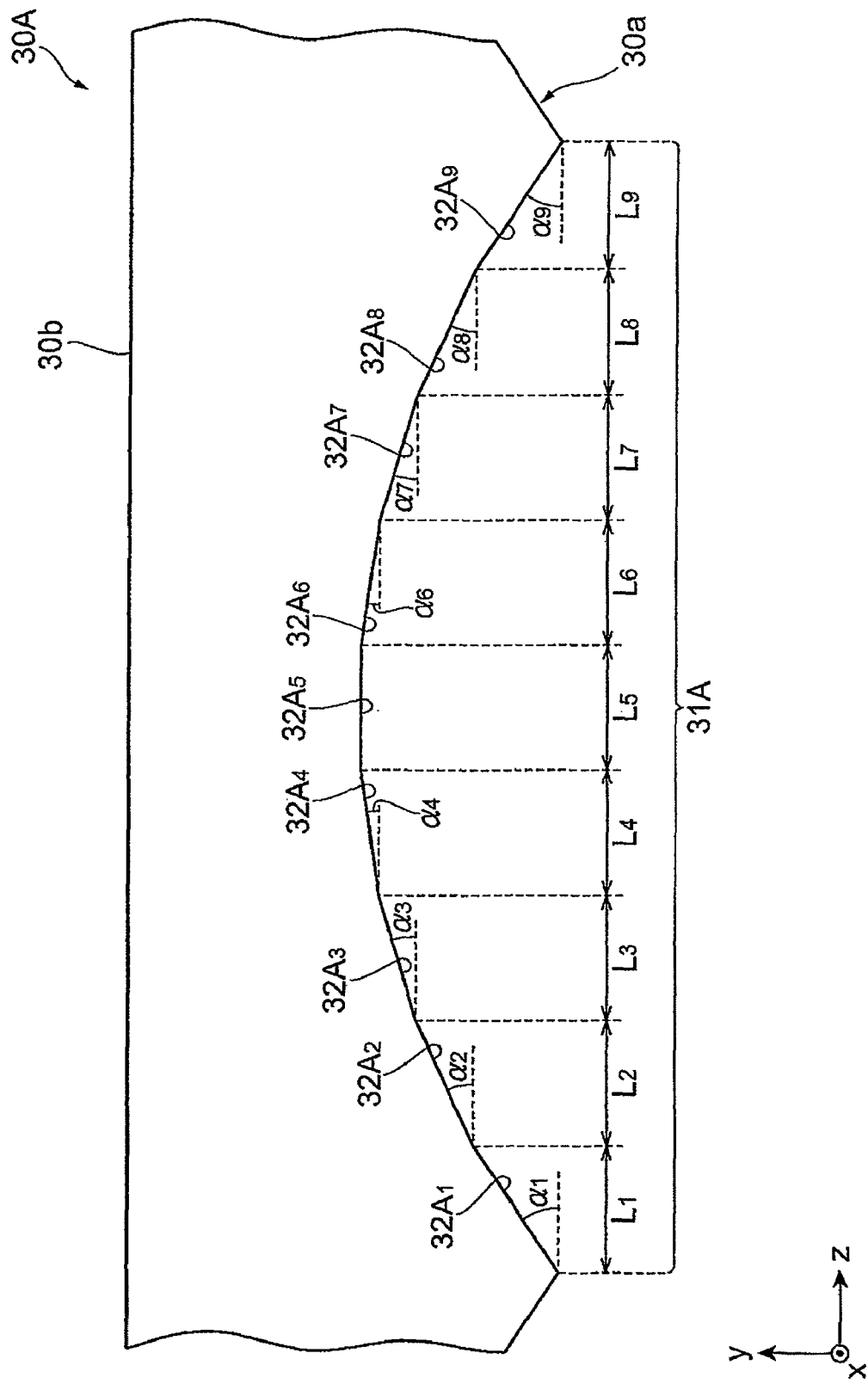
FIG. 4 is an enlarged-view diagram of a portion of the light control plate illustrated in FIG. 3.
Figure 5:
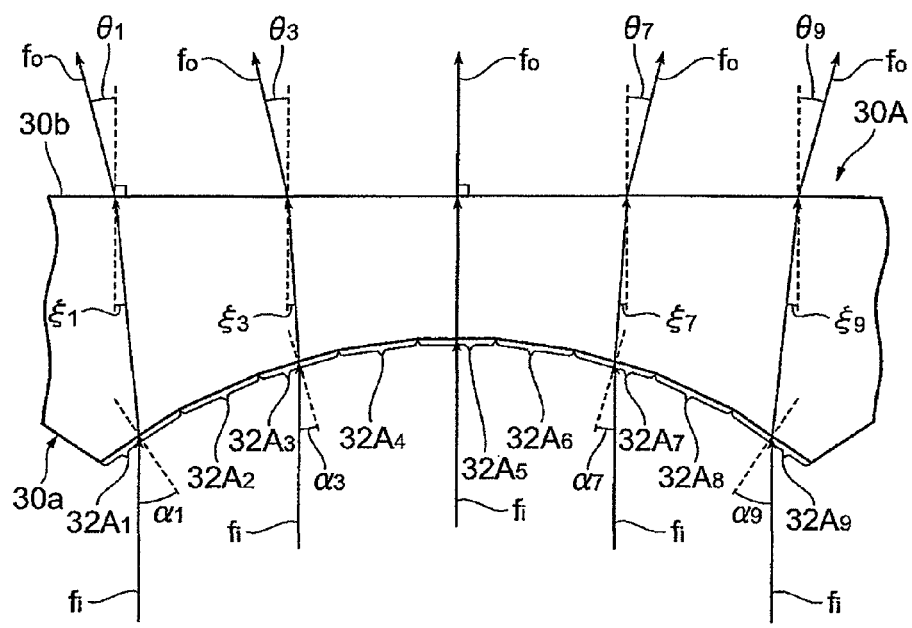
FIG. 5 is an enlarged-view diagram of a portion of the light control plate illustrated in FIG. 3.

The constitution of the optical path control sections 31A is explained next with reference to FIGS. 4 and 5. FIGS. 4 and 5 are partial enlarged diagrams of the light control plate. FIG. 5 illustrates schematically an example of the optical path of plural light beams $f_i$ that are incident on the optical path control sections 31A.

As illustrated in FIGS. 4 and 5, the surface of the optical path control sections 31A comprise each M (M is an integer equal to or greater than 2) first to M-th planar portions $32A_1$ to $32A_M$ each of which extends in the x-axis direction. The example illustrated in FIG. 4 corresponds to a case where M=9.

The first to M-th planar portions $32A_1$ to $32A_M$ are parallel or oblique relative to a plane that is parallel to the light exit surface 30b. The first to M-th planar portions $32A_1$ to $32A_M$ are configured in such a manner that the outgoing light $F_o$ exiting from the light control plate 30A becomes spread within an exit angle range $-\theta_{max}$ to $\theta_{max}$ relative to the exit direction (i.e. the y-axis direction) of the parallel light $F_i$ from the surface light source 20, and such that the luminance angular distribution of the outgoing light $F_o$ is substantially constant within that exit angle range.

Specifically, the first to M-th planar portions $32A_1$ to $32A_M$ are configured in such a manner that inclination angles $\alpha_1$ to $\alpha_M$ formed between a plane parallel to the light exit surface 30b and the first to M-th planar portions $32A_1$ to $32A_M$, and pitch ratios $L_1$ to $L_M$, satisfy predetermined conditions. As illustrated in FIG. 4, the pitch ratios $L_1$ to $L_M$ correspond to the lengths in the z-axis direction of the respective first to M-th planar portions $32A_1$ to $32A_M$.

An explanation follows next on the predetermined conditions that are to be satisfied by the inclination angles $\alpha_1$ to $\alpha_M$ and the pitch ratios $L_1$ to $L_M$. In the explanation below, n denotes the refractive index of the light control plate 30A, $n_0$ denotes the refractive index of the medium in contact with the light incidence surface 30a of the light control plate 30A, on the side of the surface light source 20, and $n_1$ denotes the refractive index of the medium in contact with the light exit surface 30b of the light control plate 30A, on the side of the transmissive image display section 10. A hypothetical three-layer structure forms as a result, with the light control plate 30A as the interlayer.

Further, $\theta_m$ denotes the exit angle, relative to the y-axis direction (predetermined direction), of a light beam $f_o$ corresponding to a light beam $f_i$ that is incident on an m-th planar portion $32A_m$ among the plural light beams $f_i$ comprised in the parallel light $F_i$, and $I(\theta_m)$ denotes the luminance of the outgoing light $F_o$ in the direction of the exit angle $\theta_m$. The exit angle $\theta_m$ has a positive direction in the clockwise direction relative to the exit direction (y-axis direction) of the parallel light $F_i$ from the surface light source 20.

Such being the case, an inclination angle $\alpha_m$ of the m-th planar portion $32A_m$ satisfies

[Equation 12]

$$\alpha_m = \sin^{-1}\left\{\frac{n}{n_0}\sin(\alpha_m - \xi_m)\right\} \quad (12)$$

wherein

[Equation 13]

$$\xi_m = \sin^{-1}\left\{\frac{n_1}{n}\sin\theta_m\right\} \quad (13)$$

[Equation 14]

$$\theta_m = \frac{2m - M - 1}{M - 1}\theta_{max} \quad (14)$$

As can be understood from equation (13), $\xi_m$ is the incidence angle, onto the light exit surface 30b, of a light beam $f_i$ refracted through incidence onto the m-th planar section $32A_m$ (see FIG. 5).

The pitch ratio $L_m$ satisfies

[Equation 15]

$$L_m = \frac{l_m}{\sum_{k=1}^{M} l_k} \quad (15)$$

wherein

[Equation 16]

$$l_m = \frac{I(\theta_m)\cos\theta_m}{T} \quad (16)$$

In equation (16), T denotes the transmittance of the light control plate 30A to the parallel light $F_i$, and is represented by the following equation

[Equation 17]

$$T = \frac{P}{1+P}T_s + \frac{1}{1+P}T_p \quad (17)$$

where $P=E_s/E_p$, $E_s$ and $E_p$ being the energies of the S-polarized component and the P-polarized component of the parallel light $F_i$, and $T_s$ and $T_p$ are the transmittances of the light control plate 30A to the S-polarized component and the P-polarized component, as given by

[Equation 18]

$$T_s = (t_1^s)^2 \frac{\cos(\alpha_m - \xi_m)}{n_0 \cos\alpha_m}(t_2^s)\frac{n_1\cos(\theta_m)}{\cos\xi_m} \quad (18)$$

[Equation 19]

$$T_p = (t_1^p)^2 \frac{\cos(\alpha_m - \xi_m)}{n_0 \cos\alpha_m}(t_2^p)\frac{n_1\cos(\theta_m)}{\cos\xi_m} \quad (19)$$

In equations (18) and (19), $t^s_1$, $t^p_1$ are the transmittances of the S-polarized component and the P-polarized component of a light beam $f_i$ at the incidence position on the m-th planar section $32A_m$, while $t^s_2$, $t^p_2$ are the transmittances of the S-polarized component and the P-polarized component of a light beam $f_o$ at the exit position on the light exit surface 30b. These transmittances are given by equations (20) through (23) below.

[Equation 20]

$$t_1^s = \frac{2n_0\cos\alpha_m}{n_0\cos\alpha_m + n\cos(\alpha_m - \xi_m)} \quad (20)$$

[Equation 21]

$$t_2^s = \frac{2n\cos\xi_m}{n\cos\xi_m + n_1\cos\theta_m} \quad (21)$$

[Equation 22]

$$t_1^p = \frac{2n_0\cos\alpha_m}{n\cos\alpha_m + n_0\cos(\alpha_m - \xi_m)} \quad (22)$$

-continued

[Equation 23]

$$t_2^p = \frac{2n\cos\xi_m}{n_1\cos\xi_m + n\cos\theta_m} \quad (23)$$

Table 1 summarizes the inclination angles $\alpha_1$ to $\alpha_9$ and the pitch ratios $L_1$ to $L_9$ calculated using the above equations (12) through (23), in an instance where $I(\theta_m)=1$ and M=9, for n=1.57, $n_0=n_1=1.0$, P=1.0, $\theta_{max}=20°$, and $\theta_m$ ranging from $-20°$ to $20°$.

TABLE 1

| m | $\alpha_m(°)$ | $L_m$ |
|---|---|---|
| 1 | 32.72 | 0.107 |
| 2 | 25.26 | 0.110 |
| 3 | 17.22 | 0.112 |
| 4 | 8.73 | 0.113 |
| 5 | 0.00 | 0.114 |
| 6 | -8.73 | 0.113 |
| 7 | -17.22 | 0.112 |
| 8 | -25.26 | 0.110 |
| 9 | -32.72 | 0.107 |

An example of a method for manufacturing the light control plate 30A is explained next. To manufacture the light control plate 30A, the inclination angles $\alpha_1$ to $\alpha_M$ and pitch ratios $L_1$ to $L_M$ of the first to M-th planar portions $32A_1$ to $32A_M$ comprised in each optical path control section 31A are determined on the basis of equations (12) through (23). Based on the inclination angles $\alpha_1$ to $\alpha_M$ and the pitch ratios $L_1$ to $L_M$ of the first to M-th planar portions $32A_1$ to $32A_M$ thus determined beforehand, the optical path control sections 31A are formed, for instance by way of a micromachining technology, on one of the surfaces of a plate material, comprising a transparent resin, that is to become the light control plate 30A, to obtain the light control plate 30A.

When building into the surface light source device 40 such a light control plate 30A, having the inclination angles $\alpha_1$ to $\alpha_M$ and pitch ratios $L_1$ to $L_M$ of the first to M-th planar portions $32A_1$ to $32A_M$ thus determined on the basis of equations (12) through (23), the light control plate 30A is disposed in the surface light source device 40 in such a manner that the side on which the optical path control sections 31A are formed is positioned on the side of the surface light source 20.

As described above, the parallel light $F_i$ having a substantially uniform luminance distribution and a constant surface flux density is emitted from the surface light source 20, so that the parallel light $F_i$ strikes the light control plate 30A. A plurality of optical path control sections 31A are formed on the light control plate 30A, on the side of the surface light source 20, and first to M-th planar portions $32A_1$ to $32A_M$ are formed on each of the optical path control sections 31A.

The inclination angles $\alpha_1$ to $\alpha_M$ and the pitch ratios $L_1$ to $L_M$ of the first to M-th planar portions $32A_1$ to $32A_M$ satisfy equations (12) through (23), and hence each light beam $f_i$ striking each of the first to M-th planar portions $32A_1$ to $32A_M$ is respectively refracted by the first to M-th planar portions $32A_1$ to $32A_M$ in such a manner so as to exit at a respective predetermined exit angle. The fraction of light, within the parallel light $F_i$, that is incident on each optical path control section 31A, is spread as a result within an exit angle range $-\theta_{max}$ to $\theta_{max}$, whereby the parallel light $F_i$ is spread within that exit angle range, as illustrated in FIG. 5. The inclination angles $\alpha_1$ to $\alpha_M$ of the first to M-th planar portions $32A_1$ to $32A_M$ are dissimilar, and hence the incidence angle of each light beam $f_i$ onto the respective first to M-th planar portions $32A_1$ to $32A_M$ is dissimilar as well. Accordingly, transmittance is different for each light beam $f_i$, within the parallel light $F_i$, which strikes the first to M-th planar portions $32A_1$ to $32A_M$. The amount of light of the light fractions, within the parallel light $F_i$, that strike the first to M-th planar portions $32A_1$ to $32A_M$, is controlled by the pitch ratios $L_1$ to $L_M$ given by equations (15) and (16). The luminance angular distribution of the outgoing light $F_o$ is controlled as a result. The luminance $I(\theta_m)$ in equation (16) is constant within the above exit angle range, and thus the luminance angular distribution of the outgoing light $F_o$ is likewise constant within the above exit angle range.

That is, the parallel light $F_i$ of substantially constant surface flux density, emitted from the surface light source 20, can be spread at the light control plate 30A within an exit angle range $-\theta_{max}$ to $\theta_{max}$, to exit as outgoing light $F_o$ having a substantially constant luminance angular distribution within that range.

For instance, when parallel light $F_i$ of constant surface flux density emitted from the surface light source 20 is employed as-is, as backlight, on the transmissive image display section 10, the light outputted by the surface light source 20 is strongly condensed into the forward normal line direction (y-axis direction) of the surface light source 20. As a result, global unevenness of image may occur when the surface light source 20 is used in large liquid crystal television sets, projectors or the like, while an appropriate viewing angle may fail to be ensured when the surface light source 20 is used in small television sets or PC monitors.

By contrast, outgoing light $F_0$, having a substantially constant luminance angular distribution within a predetermined exit angle range, can be obtained from parallel light $F_i$ emitted from the surface light source 20 by arranging the light control plate 30A in front of the surface light source 20. Accordingly, using the light control plate 30A, and the surface light source device 40 comprising the light control plate 30A, allows achieving easily a larger transmissive image display device 1 while also securing easily the viewing angle. Also, plural optical path control sections 31A are formed as a microstructure of the light control plate 30A. As a result, the transmissive image display section 10 can be illuminated with light having a substantially constant surface flux density, even if the incident parallel light $F_i$, of substantially constant surface flux density, has an angular distribution range spread over a small region. Images of substantially uniform brightness can thus be displayed thereby on the transmissive image display section 10.

Figure 6:
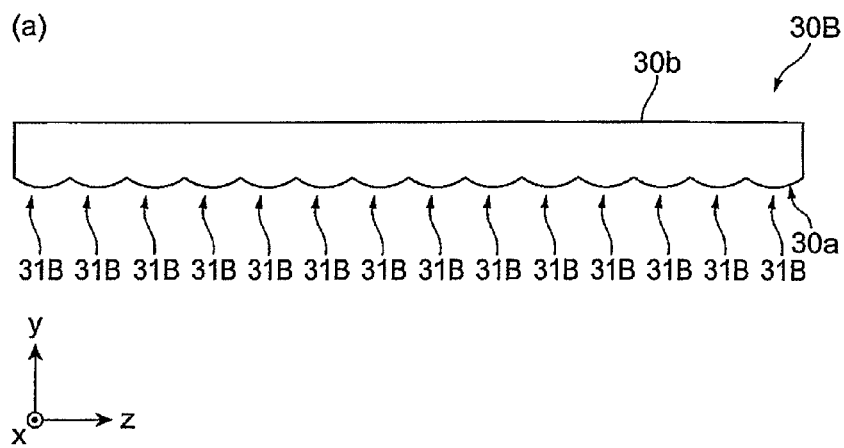
FIG. 6 is a side-view diagram illustrating schematically the constitution of a modification of the light control plate illustrated in FIG. 3.
Figure 6:
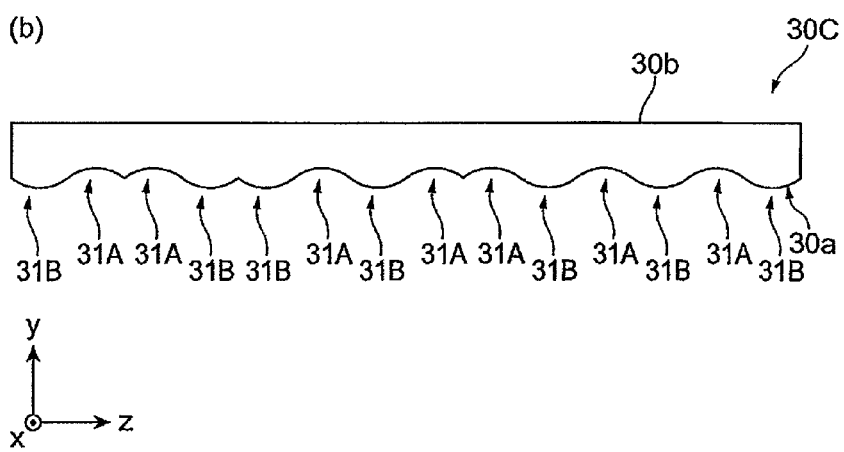

In the light control plate 30A illustrated in FIG. 3, the cross-sectional shape of the optical path control sections 31A was concave. However, the shape of the optical path control sections 31A is not limited thereto, nor is it particularly limited otherwise, provided that the optical path control sections 31A comprise first to M-th planar portions $32A_1$ to $32A_M$ having inclination angles $\alpha_1$ to $\alpha_M$ and pitch ratios $L_1$ to $L_M$ that satisfy equations (12) through (23). For instance, the light control plate may have optical path control sections 31B of convex cross-sectional shape, as in the light control plate 30B illustrated in (a) of FIG. 6. Also, the light control plate may comprise both optical path control sections 31A of concave cross-sectional shape and optical path control sections 31B of convex cross-sectional shape, as in the light control plate 30C illustrated in (b) of FIG. 6.

Figure 7:
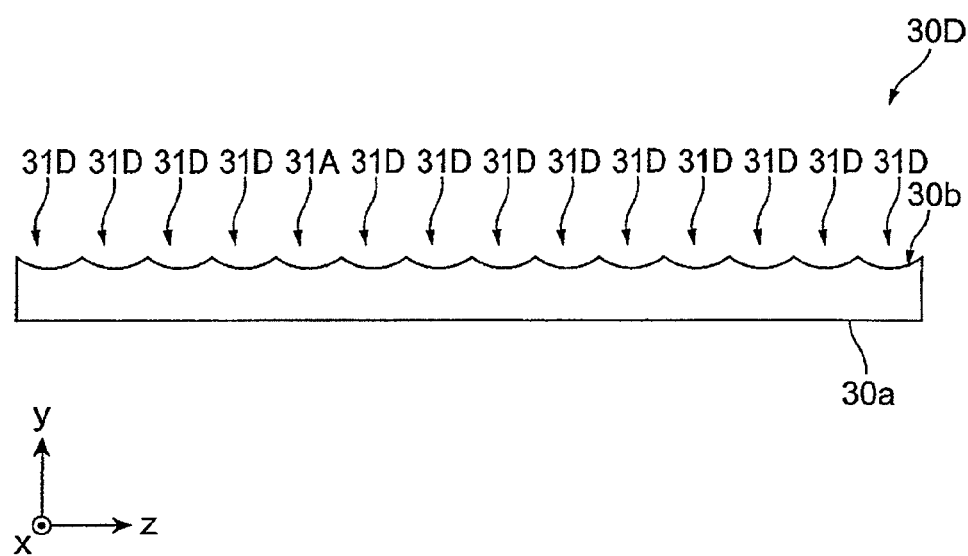
FIG. 7 is a side-view diagram illustrating schematically the constitution of a second embodiment of the light control plate according to the present invention.

A second embodiment of the light control plate 30 is explained next. FIG. 7 is a side-view diagram illustrating schematically the constitution of a second embodiment of the light control plate 30.

Figure 8:
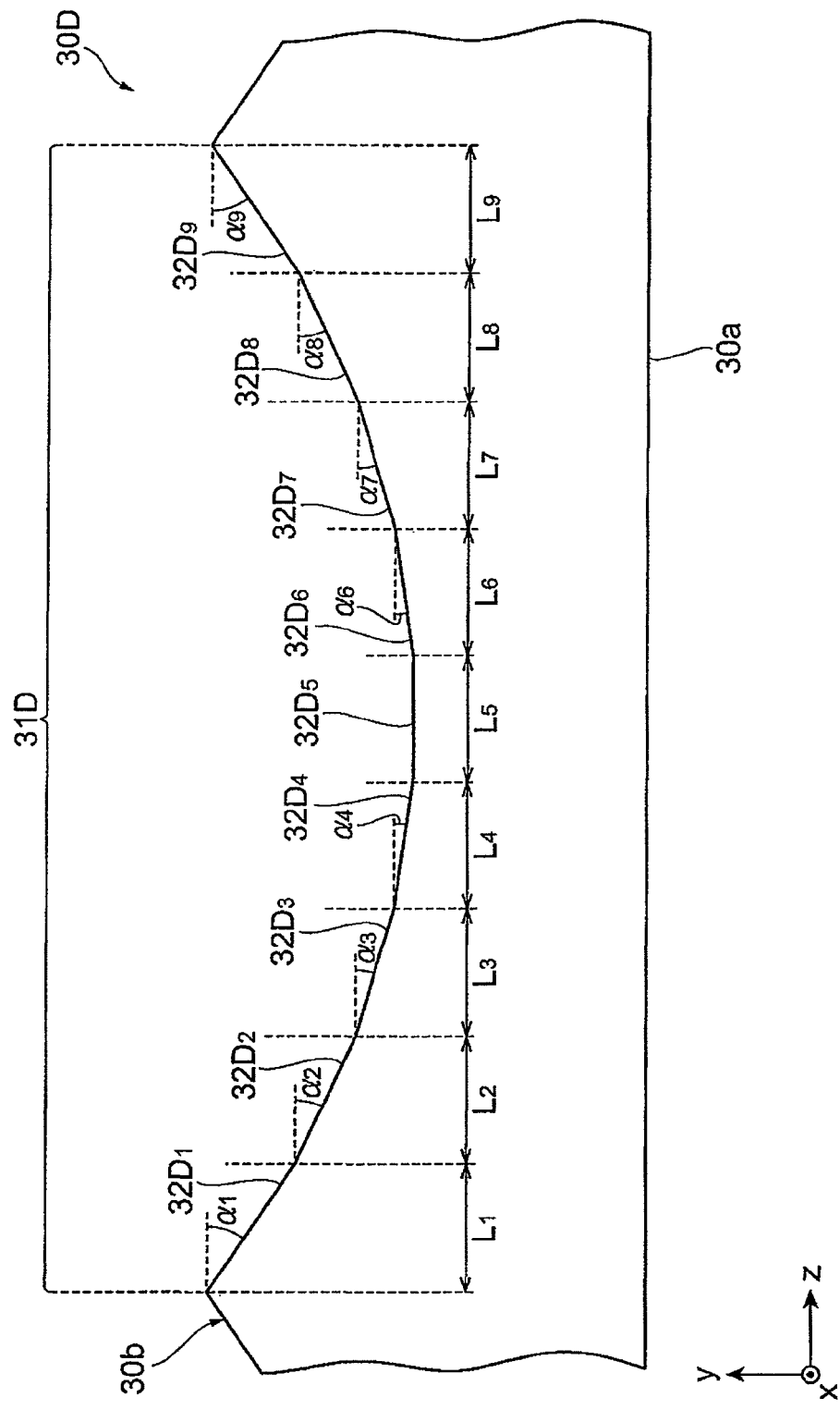
FIG. 8 is an enlarged-view diagram of a portion of the light control plate illustrated in FIG. 7.
Figure 9:
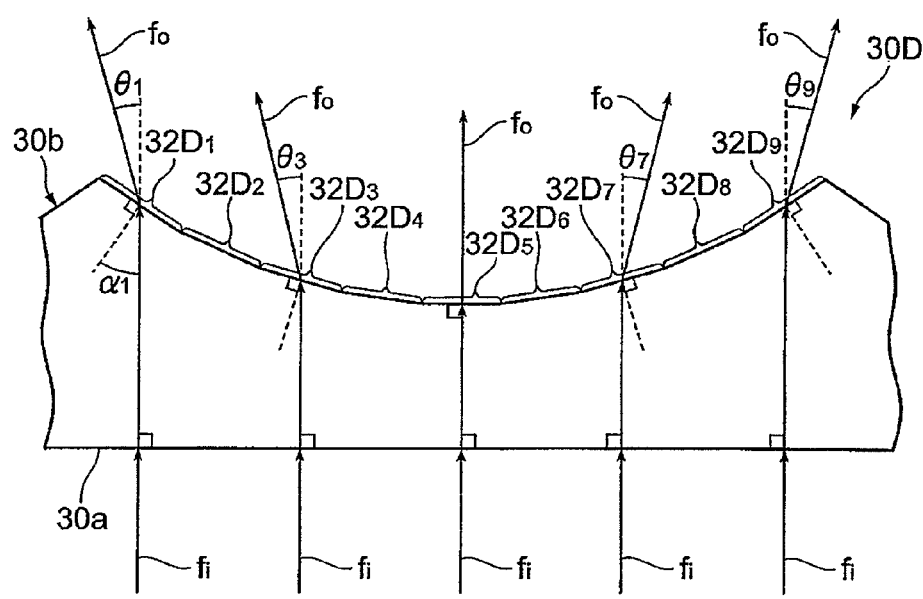
FIG. 9 is an enlarged-view diagram of a portion of the light control plate illustrated in FIG. 7.
Figure 9:
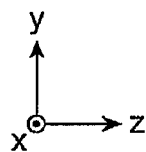

As illustrated in FIG. 7, plural optical path control sections 31D are formed on the light exit surface 30b of a light control plate 30D. The constitution of the light control plate 30D differs from that of the light control plate 30A illustrated in FIG. 3 in that now the light incidence surface 30a is planar, and the optical path control sections 31D are provided on the light exit surface 30b. The light control plate 30D will be explained with reference to FIGS. 8 and 9, focusing on this difference. FIGS. 8 and 9 are enlarged-view diagrams of portions of the light control plate illustrated in FIG. 7. FIG. 9 illustrates schematically an example of the optical paths of light beams $f_i$ incident on the optical path control sections 31D.

As illustrated in FIGS. 8 and 9, the surface of the optical path control sections 31D comprise each M (M is an integer equal to or greater than 2) first to M-th planar portions $32D_1$ to $32D_M$ that extend each in the x-axis direction. The example illustrated in FIG. 8 corresponds to a case where M=9. The first to M-th planar portions $32D_1$ to $32D_M$ are parallel or oblique relative to a plane that is parallel to the light incidence surface 30a. The first to M-th planar portions $32D_1$ to $32D_M$ are configured in such a manner that the outgoing light $F_o$ exiting from the light control plate 30D becomes spread within an exit angle range $-\theta_{max}$ to $\theta_{max}$ relative to the exit direction (i.e. the y-axis direction) of the parallel light $F_i$ from the surface light source 20, and such that the luminance angular distribution of the outgoing light $F_o$ is substantially constant within that exit angle range.

Specifically, the first to M-th planar portions $32D_1$ to $32D_M$ are configured in such a manner that inclination angles $\alpha_1$ to $\alpha_M$ formed between a plane parallel to the light incidence surface 30a and the first to M-th planar portions $32D_1$ to $32D_M$, and pitch ratios $L_1$ to $L_M$, satisfy equations (24) through (32). Equations (24) through (32) below apply to an m-th planar portion $32D_m$ (m is an integer from 1 to M). In the equations, n, $n_1$ and $\theta_m$ are defined in the same way as in the first embodiment, i.e. are identical to those in the explanation based on FIGS. 4 and 5.

Firstly, the inclination angle $\alpha_m$ of the m-th planar portion $32D_m$ satisfies

[Equation 24]

$$\alpha_m = \sin^{-1}\left\{\frac{n_1}{n}\sin(\theta_m + \alpha_m)\right\} \quad (24)$$

wherein

[Equation 25]

$$\theta_m = \frac{2m - M - 1}{M - 1}\theta_{max} \quad (25)$$

Also, the pitch ratio $L_m$ of the m-th planar portion $32D_m$ satisfies

[Equation 26]

$$L_m = \frac{l_m}{\sum_{k=1}^{M} l_k} \quad (26)$$

wherein

[Equation 27]

$$l_m = \frac{I(\theta_m)\cos\theta_m}{T} \quad (27)$$

In the present embodiment, T in equation (27) satisfies

[Equation 28]

$$T = \frac{P}{1+P}T_s + \frac{1}{1+P}T_p \quad (28)$$

wherein

[Equation 29]

$$T_s = (t^s)^2 \frac{n_1 \cos(\theta_m + \alpha_m)}{n \cos\alpha_m} \quad (29)$$

[Equation 30]

$$T_p = (t^p)^2 \frac{n_1 \cos(\theta_m + \alpha_m)}{n \cos\alpha_m} \quad (30)$$

[Equation 31]

$$t^s = \frac{2n\cos\alpha_m}{n\cos\alpha_m + n_1\cos(\theta_m + \alpha_m)} \quad (31)$$

[Equation 32]

$$t^p = \frac{2n\cos\alpha_m}{n_1\cos\alpha_m + n\cos(\theta_m + \alpha_m)} \quad (32)$$

Table 2 summarizes the inclination angles $\alpha_1$ to $\alpha_9$ and the pitch ratios $L_1$ to $L_9$ calculated using the above equations (24) through (32), in an instance where $I(\theta_m)=1$ and M=9, for n=1.57, $n_1$=1.0, P=1.0, $\theta_{max}$=20°, and $\theta_m$ ranging from −20° to 20°.

TABLE 2

| m | $\alpha_m$(°) | $L_m$ |
|---|---|---|
| 1 | 28.49 | 0.108 |
| 2 | 23.19 | 0.110 |
| 3 | 16.53 | 0.112 |
| 4 | 8.64 | 0.113 |
| 5 | 0.00 | 0.113 |
| 6 | −8.64 | 0.113 |
| 7 | −16.53 | 0.112 |
| 8 | −23.19 | 0.110 |
| 9 | −28.49 | 0.108 |

An example of a manufacturing method of the light control plate 30D is identical to that of the first embodiment, except that herein the inclination angles $\alpha_1$ to $\alpha_M$ and pitch ratios $L_1$ to $L_M$ are determined on the basis of equations (24) through (32), instead of equations (12) through (23) as in the first embodiment.

When building into the surface light source device 40 such a light control plate 30D, having the inclination angles $\alpha_1$ to $\alpha_M$ and pitch ratios $L_1$ to $L_M$ thus determined on the basis of equations (24) through (32), the light control plate 30D is disposed in the surface light source device 40 in such a manner that the side on which the optical path control sections 31D are formed is positioned on the side of the transmissive image display section 10.

The effect and advantages of the light control plate 30D are identical to the effect and advantages of the light control plate 30A of the first embodiment. That is, the parallel light $F_i$ of substantially constant surface luminous flux density emitted from the light source 20 can be spread at the light control plate 30D into an exit angle range $-\theta_{max}$ to $\theta_{max}$, to exit as outgoing light $F_o$ having a substantially constant luminance angular distribution within that range. Accordingly, using the light control plate 30D, and the surface light source device 40 comprising the light control plate 30D, allows achieving easily a larger transmissive image display device 1 while also securing easily the viewing angle. Also, plural optical path control sections 31D are formed as a microstructure of the light control plate 30D. As a result, the transmissive image display section 10 can be illuminated with light having a substantially constant surface flux density, even if the incident parallel light $F_i$ of substantially constant surface flux density has an angular distribution range spread over a small region. Images of substantially uniform brightness can thus be displayed thereby on the transmissive image display section 10.

Figure 10:
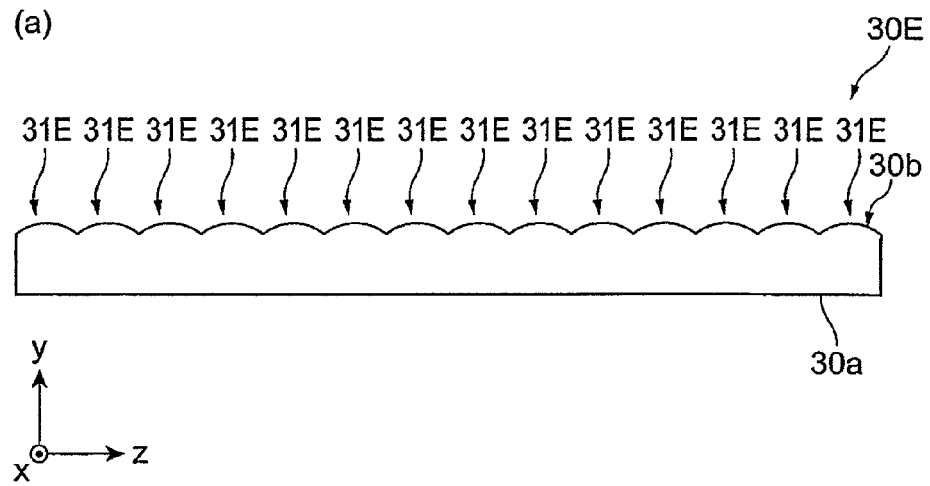
FIG. 10 is a side-view diagram illustrating schematically the constitution of a modification of the light control plate illustrated in FIG. 7.
Figure 10:
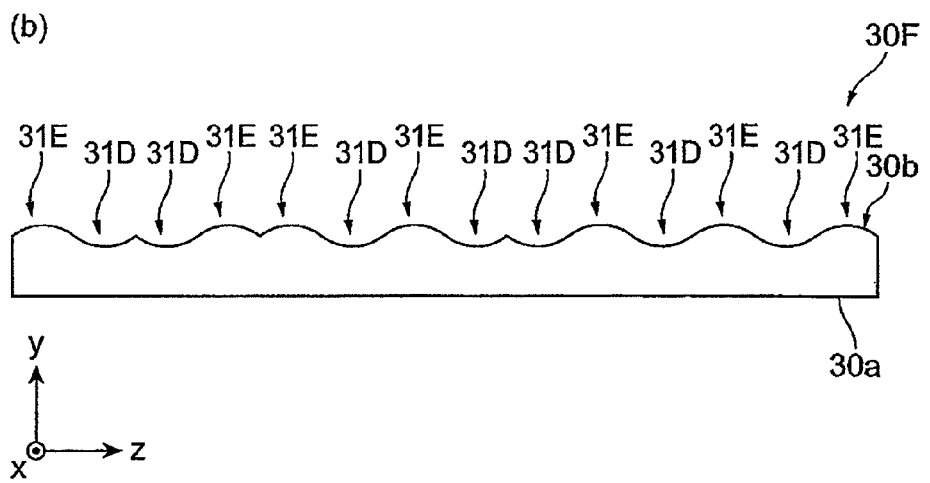

In the light control plate 30D illustrated in FIG. 7, the cross-sectional shape of the optical path control sections 31D is concave. However, the shape of the optical path control sections 31D is not limited thereto, nor is it particularly limited otherwise, provided that the optical path control sections 31D comprise each first to M-th planar portions $32D_1$ to $32D_M$ having inclination angles $\alpha_1$ to $\alpha_M$ and pitch ratios $L_1$ to $L_M$ that satisfy equations (24) through (32). For instance, a light control plate may have optical path control sections 31E of convex cross-sectional shape, as in the light control plate 30E illustrated in (a) of FIG. 10. Also, the light control plate may comprise both optical path control sections 31D of concave cross-sectional shape and optical path control sections 31E of convex cross-sectional shape, as in the light control plate 30F illustrated in (b) of FIG. 10.

The effect and advantages of the light control plate 30 are explained in detail next on the basis of simulation results. The light control plate 30A illustrated in FIG. 3 and the light control plate 30D illustrated in FIG. 7 were used as models of the light control plate 30 in the simulation. The simulation was carried out for M=18001. The simulation was performed for maximum exit angles $\theta_{max}$ of 10°, 15°, 20° and 30° of the exit angle range of the outgoing light $F_o$, relative to the exit direction of the parallel light $F_i$ from the surface light source 20 (predetermined direction, y-axis direction). In the simulation, $I(\theta)$ is considered constant for any angle $\theta$, within $-\theta_{max}$ to $\theta_{max}$, relative to the exit direction of the parallel light $F_i$ from the surface light source 20. The refractive index n of the light control plates 30A, 30D is 1.57, and the above-described refractive indices $n_0$, $n_1$ are both 1.0.

For comparison purposes, a simulation was also carried out for a case in which the cross-sectional shape of the surface of the optical path control sections of the light control plates 30A, 30D was an arc of predetermined radius. The arcs used in the comparison were set in such a manner that both ends of the arcs contact with both ends of the optical path control sections 31A, 31D of the light control plates 30A, 30D.

FIGS. 11 to 14 illustrate the simulation results for a maximum exit angle $\theta_{max}$ of 10°, 15°, 20° and 30°, respectively. The abscissa represents the angle $\theta$ and the ordinate represents relative luminance. The relative luminance is a luminance in which $I(\theta)$ of the light control plate 30D of the second embodiment is normalized to 1.

Figure 11:
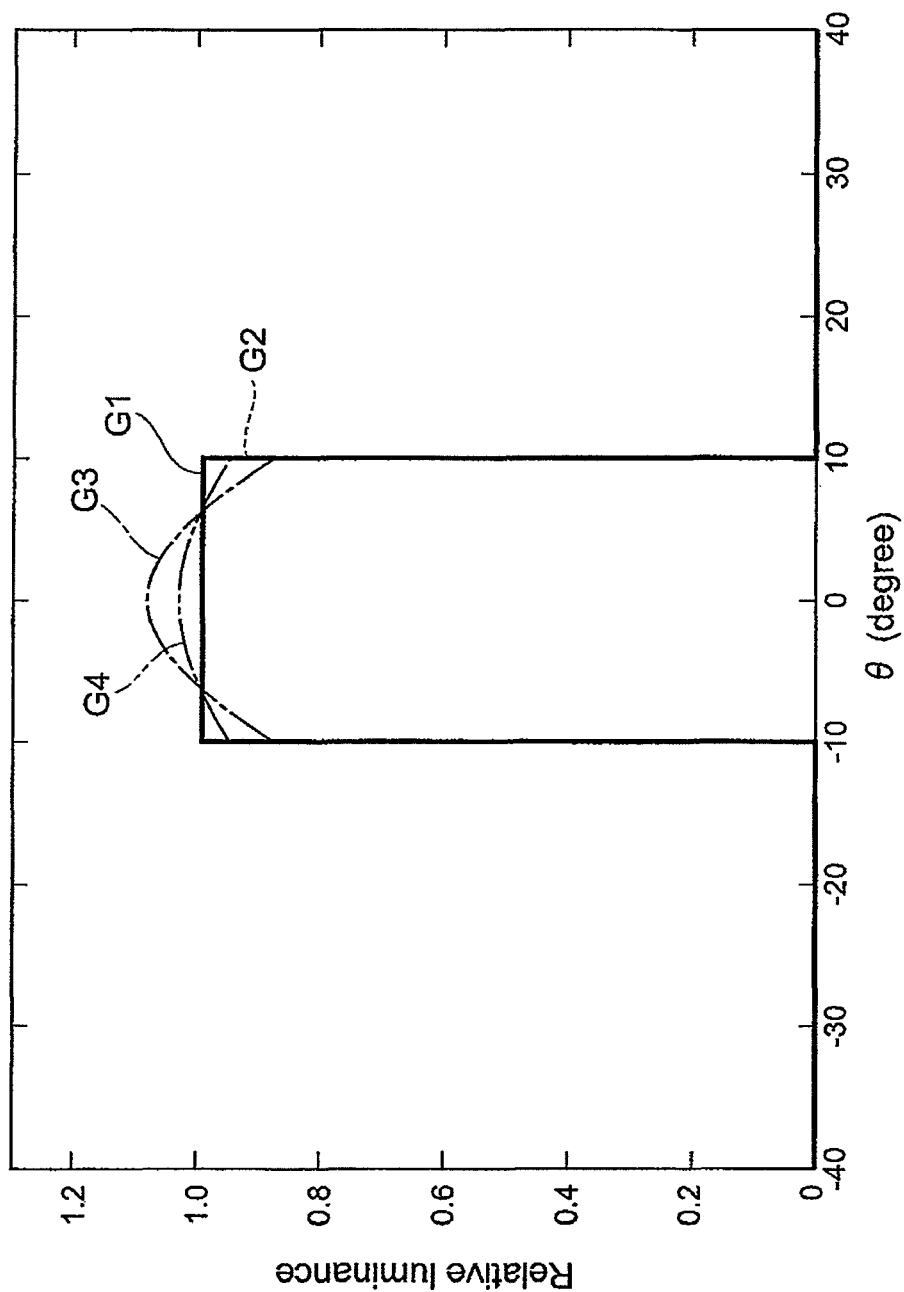
FIG. 11 is a graph illustrating the results of luminance angular distribution simulation, for a maximum exit angle of 10°.
Figure 12:
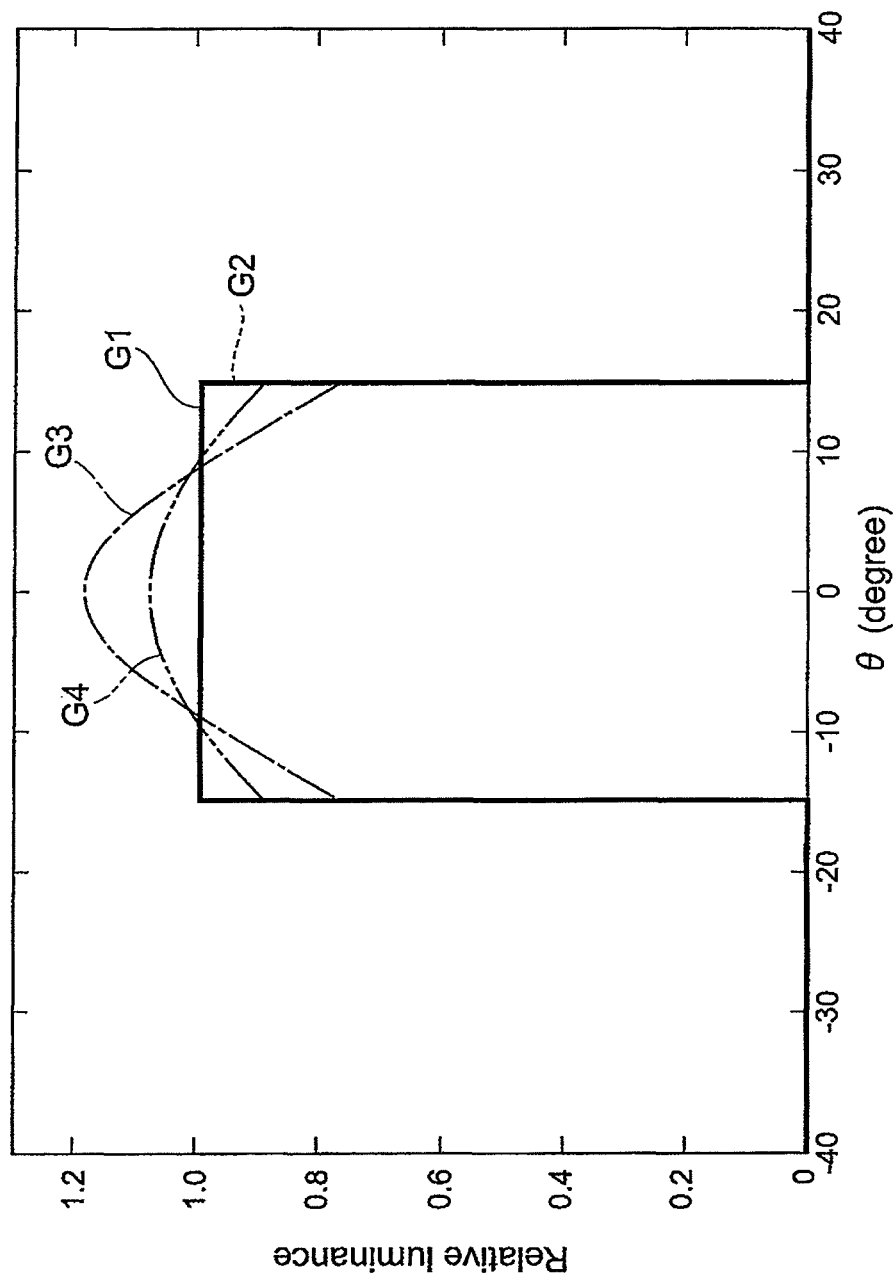
FIG. 12 is a graph illustrating the results of luminance angular distribution simulation, for a maximum exit angle of 15°.
Figure 13:
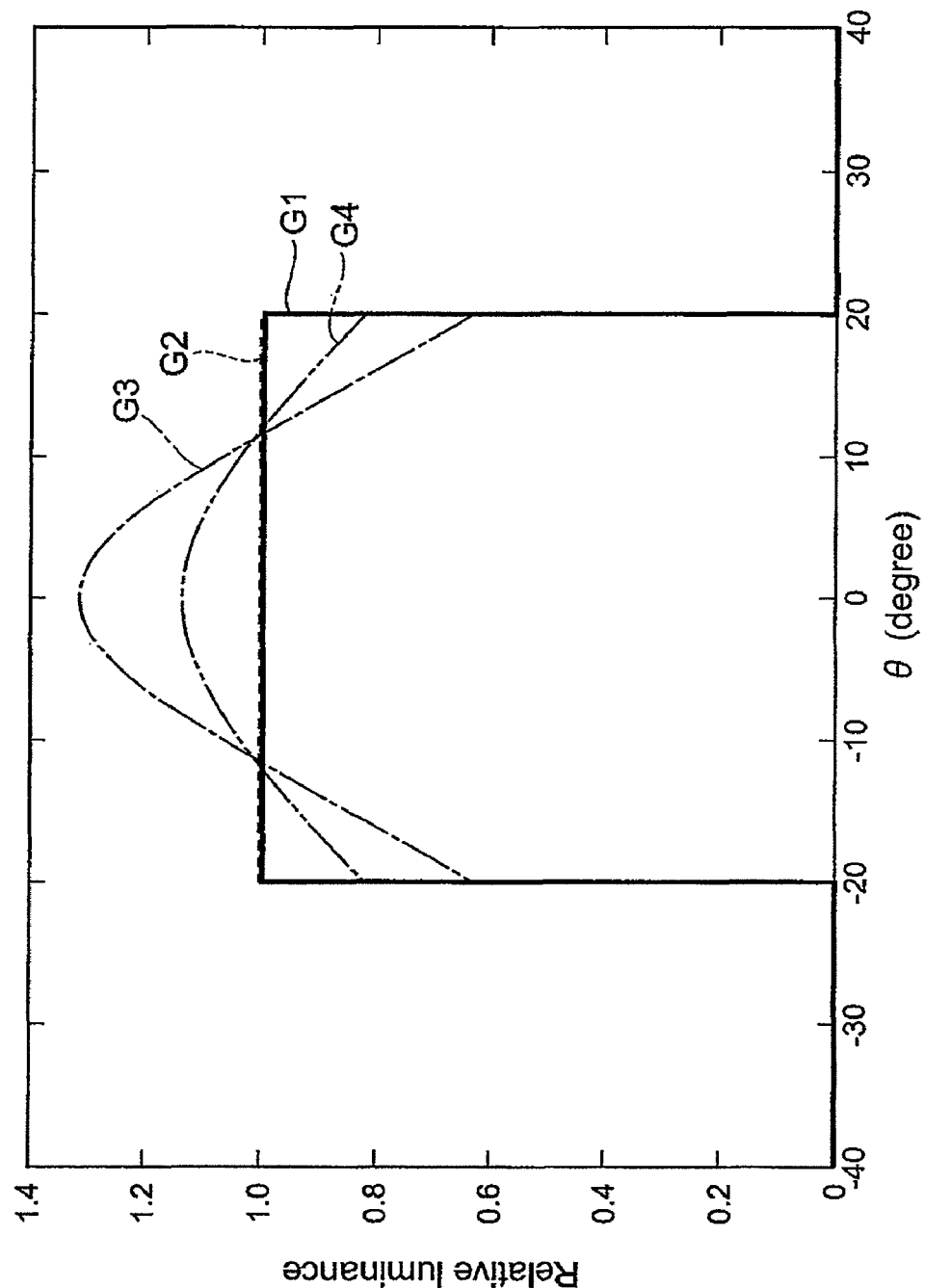
FIG. 13 is a graph illustrating the results of luminance angular distribution simulation, for a maximum exit angle of 20°.
Figure 14:
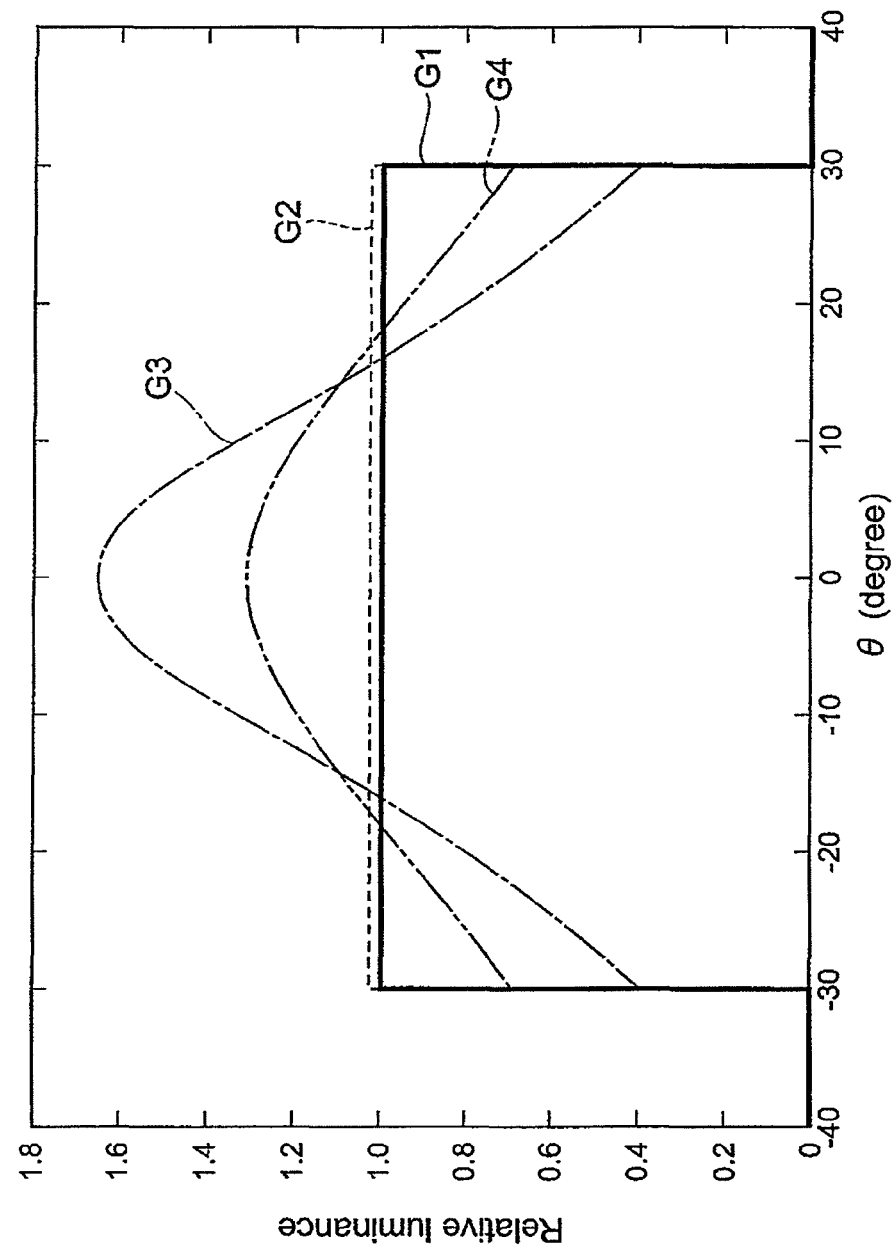
FIG. 14 is a graph illustrating the results of luminance angular distribution simulation, for a maximum exit angle of 30°.

The graph G2 in each figure corresponds to results when the optical path control sections 31A are formed on the light incidence surface 30a, as illustrated in FIGS. 3 to 5. The graph G1 in each figure corresponds to results when the optical path control sections 31D are formed on the light exit surface 30b, as illustrated in FIGS. 7 to 9. In FIGS. 11 and 12, the graph G1 and the graph G2 substantially overlap each other. The graph G4 and the graph G3, which depict the results of the above-described comparison, correspond to results when optical path control sections having a surface with an arcuate cross section are formed on the light incidence surface 30a and the light exit surface 30b, respectively.

As the results of the simulations of FIGS. 11 to 14 show, the luminance angular distribution of the outgoing light $F_o$ becomes constant within a predetermined exit angle range when the optical path control sections 31A, 31D of the first and second embodiments are provided. In the case of an arcuate shape, by contrast, the luminance angular distribution of the outgoing light is not constant, but exhibits a distribution in which luminance increases in the vicinity of $\theta=0$ in FIGS. 11 to 14.

That is, forming the optical path control sections 31A, 31D of the first and second embodiments allows spreading the parallel light $F_i$ into a predetermined exit angle range while making the luminance angular distribution substantially constant within that exit angle range. Accordingly, the light control plates 30A, 30D, and the surface light source device 40 comprising such a light control plate, allow achieving easily a larger transmissive image display device 1 while also securing easily the viewing angle.

The present invention is not limited to the embodiments explained thus far, which can be modified in various ways. For instance, although the optical path control sections 31 in the light control plate 30 have all identical shape, the shape and size of the optical path control sections may vary, provided that the first to M-th planar portions in each optical path control section 31 satisfies equations (12) through (23), or equations (24) through (32).

Also, the transmittance T used in equation (16) is prescribed by equations (17) and (18), and the transmittance T used in equation (27) is prescribed by equations (28) through (32). That is, the transmittance T is prescribed in view of the energy of the P-polarized component and the S-polarized component of the parallel light $F_i$, but that need not necessarily be the case. For instance, there can also be used a theoretical transmittance T determined in accordance with the wavelength of the light emitted by the surface light source and with the constituent material of the light control plate. Moreover, transmittance varies ordinarily depending on the P-polarized component and the S-polarized component. Therefore, the transmittance T is preferably prescribed in view of the energy of the P-polarized component and the S-polarized component of the parallel light $F_i$, as doing so allows obtaining an outgoing light $F_o$ having more desirable characteristics.

Also, FIGS. 4, 5, 8 and 9 depict examples in which M=9. However, the number of first to M-th planar portions, while no smaller than 2, is not limited to 9, and may be 8 or fewer or 10 or more. A larger number M is preferable since an outgoing light $F_o$ having more desirable characteristics is achieved as a result. When the number M is large, i.e. when the number of planar portions is large, the surface shape of the optical path control sections 31 becomes smoother and closer to a curved surface. It is also possible to provide a single optical path control section 31 on the light incidence surface 30a or the light exit surface 30b.

In the explanation above, the light control plate 30 and the surface light source device 40 comprising the light control plate 30 are used in the transmissive image display device 1. The light control plate 30 and the surface light source device 40, however, are not limited to that use, and may be appropriately employed wherever there is required light having an angular spread within a given range, and a luminance angular distribution that is constant within that angular spread, for instance in illumination or the like.

What is claimed is:

1. A light control plate, which is disposed, relative to a surface light source, on a side of a predetermined direction in which the surface light source emits parallel light having a substantially uniform luminance distribution, and which is disposed so as to be substantially perpendicular to the predetermined direction, the light control plate comprising:
    a light incidence surface onto which the parallel light from the surface light source is incident; and
    a planar light exit surface, disposed opposite the light incidence surface, from which the parallel light that is incident on the light incidence surface exits as outgoing light,
    wherein an optical path control section extending in one direction and having a concave and/or convex cross-sectional shape is formed on the light incidence surface,
    a surface of the optical path control section comprises first to M-th planar portions (M is an integer equal to or greater than 2) respectively extending in the one direction,
    an inclination angle $\alpha_m$ formed between a plane parallel to the light exit surface and an m-th planar portion (m is an integer from 1 to M) satisfies

[Equation 1]
$$\alpha_m = \sin^{-1}\left\{\frac{n}{n_0}\sin(\alpha_m - \xi_m)\right\} \quad (1)$$

in which

[Equation 2]
$$\xi_m = \sin^{-1}\left\{\frac{n_1}{n}\sin\theta_m\right\} \quad (2)$$

[Equation 3]
$$\theta_m = \frac{2m - M - 1}{M - 1}\theta_{max} \quad (3)$$

where n is a refractive index of the light control plate, $n_0$ is a refractive index at the light incidence surface on the side of the surface light source, $n_1$ is a refractive index at the light exit surface on an opposite side to the light incidence surface, $-\theta_{max}$ to $\theta_{max}$ is an exit angle range of the outgoing light relative to the predetermined direction, $\theta_m$ is an exit angle, relative to the predetermined direction, of light, within the parallel light, which is incident via the m-th planar portion and exits through the light exit surface, $I(\theta_m)$ is a luminance in a direction of the exit angle θm, and T is a transmittance of the light control plate to the parallel light, a pitch ratio $L_m$ of the m-th planar portion satisfies

[Equation 4]
$$L_m = \frac{l_m}{\sum_{k=1}^{M} l_k} \quad (4)$$

in which

[Equation 5]
$$l_m = \frac{I(\theta_m)\cos\theta_m}{T} \quad (5)$$

and the luminance $I(\theta_m)$ is substantially constant within the exit angle range.

2. The light control plate according to claim 1, wherein the transmittance T satisfies

[Equation 6]
$$T = \frac{P}{1+P}T_s + \frac{1}{1+P}T_p \quad (6)$$

where P is $E_s/E_p$, $E_s$ and $E_p$ being the energies of an S-polarized component and a P-polarized component in the parallel light,
and $T_s$ and $T_p$ are the transmittances of the S-polarized component and the P-polarized component in the light control plate.

3. The light control plate according to claim 1, wherein the light control plate has a plurality of the optical path control sections, and
the plurality of optical path control sections are arrayed in a direction substantially perpendicular to the predetermined direction and the one direction.

4. The light control plate according to claim 2, wherein the light control plate has a plurality of the optical path control sections, and
the plurality of optical path control sections are arrayed in a direction substantially perpendicular to the predetermined direction and the one direction.

5. A surface light source device, comprising:
a surface light source that emits parallel light having a substantially uniform luminance distribution, in a predetermined direction; and
the light control plate according to claim 1, which is disposed, relative to the surface light source, on a side of the predetermined direction, and which is disposed so as to be substantially perpendicular to the predetermined direction.

6. A surface light source device, comprising:
a surface light source that emits parallel light having a substantially uniform luminance distribution, in a predetermined direction; and
the light control plate according to claim 2, which is disposed, relative to the surface light source, on a side of the predetermined direction, and which is disposed so as to be substantially perpendicular to the predetermined direction.

7. A surface light source device, comprising:
a surface light source that emits parallel light having a substantially uniform luminance distribution, in a predetermined direction; and the light control plate according to claim 3, which is disposed, relative to the surface light source, on a side of the predetermined direction, and which is disposed so as to be substantially perpendicular to the predetermined direction.

8. A surface light source device, comprising:

a surface light source that emits parallel light having a substantially uniform luminance distribution, in a predetermined direction; and the light control plate according to claim 4, which is disposed, relative to the surface light source, on a side of the predetermined direction, and which is disposed so as to be substantially perpendicular to the predetermined direction.

9. A transmissive image display device, comprising:

the surface light source device according to claim 5; and a transmissive image display section disposed, relative to the surface light source device, on a side of the predetermined direction, and onto which the outgoing light from the surface light source device is incident.

10. A transmissive image display device, comprising:

the surface light source device according to claim 6; and a transmissive image display section disposed, relative to the surface light source device, on a side of the predetermined direction, and onto which the outgoing light from the surface light source device is incident.

11. A light control plate, which is disposed, relative to a surface light source, on a side of a predetermined direction in which the surface light source emits parallel light having a substantially uniform luminance distribution, and which is disposed so as to be substantially perpendicular to the predetermined direction, the light control plate comprising:

a planar light incidence surface onto which the parallel light from the surface light source is incident; and a light exit surface, disposed opposite the light incidence surface, from which the parallel light that is incident on the light incidence surface exits as outgoing light, wherein an optical path control section extending in one direction and having a concave and/or convex cross-sectional shape is formed on the light exit surface, a surface of the optical path control section comprises first to M-th planar portions (M is an integer equal to or greater than 2) respectively extending in the one direction, an inclination angle $\alpha_m$ formed between a plane parallel to the light incidence surface and an m-th planar portion (m is an integer from 1 to M) satisfies

[Equation 7]

$$\alpha_m = \sin^{-1}\left\{\frac{n_1}{n}\sin(\theta_m + \alpha_m)\right\} \quad (7)$$

in which

[Equation 8]

$$\theta_m = \frac{2m - M - 1}{M - 1}\theta_{max} \quad (8)$$

where n is a refractive index of the light control plate, $n_1$ is a refractive index at the light exit surface on an opposite side to the light incidence surface, $-\theta_{max}$ to $\theta_{max}$ is an exit angle range of the outgoing light relative to the predetermined direction, $\theta_m$ is an exit angle, relative to the predetermined direction, of light, within the outgoing light, which exits through the m-th planar portion, $I(\theta_m)$ is a luminance in a direction of the exit angle $\theta_m$, and T is a transmittance of the light control plate to the parallel light, a pitch ratio $L_m$ of the m-th planar portion satisfies

[Equation 9]

$$L_m = \frac{l_m}{\sum_{k=1}^{M} l_k} \quad (9)$$

in which

[Equation 10]

$$l_m = \frac{I(\theta_m)\cos\theta_m}{T} \quad (10)$$

and the luminance $I(\theta_m)$ is substantially constant within the exit angle range.

12. The light control plate according to claim 11, wherein the transmittance T is

[Equation 11]

$$T = \frac{P}{1+P}T_s + \frac{1}{1+P}T_p \quad (11)$$

where P is $E_s/E_p$, $E_s$ and $E_p$ being the energies of an S-polarized component and a P-polarized component in the parallel light, and $T_s$ and $T_p$ are the transmittances of the S-polarized component and the P-polarized component in the light control plate.

13. The light control plate according to claim 11, wherein the light control plate has a plurality of the optical path control sections, and the plurality of optical path control sections are arrayed in a direction substantially perpendicular to the predetermined direction and the one direction.

14. The light control plate according to claim 12, wherein the light control plate has a plurality of the optical path control sections, and the plurality of optical path control sections are arrayed in a direction substantially perpendicular to the predetermined direction and the one direction.

15. A surface light source device, comprising:

a surface light source that emits parallel light having a substantially uniform luminance distribution, in a predetermined direction; and the light control plate according to claim 11, which is disposed, relative to the surface light source, on a side of the predetermined direction, and which is disposed so as to be substantially perpendicular to the predetermined direction.

16. A surface light source device, comprising:

a surface light source that emits parallel light having a substantially uniform luminance distribution, in a predetermined direction; and the light control plate according to claim 12, which is disposed, relative to the surface light source, on a side of the predetermined direction, and which is disposed so as to be substantially perpendicular to the predetermined direction.

17. A surface light source device, comprising:
a surface light source that emits parallel light having a substantially uniform luminance distribution, in a predetermined direction; and
the light control plate according to claim 13, which is disposed, relative to the surface light source, on a side of the predetermined direction, and which is disposed so as to be substantially perpendicular to the predetermined direction.

18. A surface light source device, comprising:
a surface light source that emits parallel light having a substantially uniform luminance distribution, in a predetermined direction; and
the light control plate according to claim 14, which is disposed, relative to the surface light source, on a side of the predetermined direction, and which is disposed so as to be substantially perpendicular to the predetermined direction.

19. A transmissive image display device, comprising:
the surface light source device according to claim 15; and
a transmissive image display section disposed, relative to the surface light source device, on a side of the predetermined direction, and onto which the outgoing light from the surface light source device is incident.

20. A transmissive image display device, comprising:
the surface light source device according to claim 16; and
a transmissive image display section disposed, relative to the surface light source device, on a side of the predetermined direction, and onto which the outgoing light from the surface light source device is incident.

* * * * *